(12) United States Patent
Kosugi et al.

(10) Patent No.: US 11,327,548 B2
(45) Date of Patent: May 10, 2022

(54) INFORMATION PROCESSING APPARATUS AND CONTROL METHOD

(71) Applicant: LENOVO (SINGAPORE) PTE. LTD., Singapore (SG)

(72) Inventors: Kazuhiro Kosugi, Yokohama (JP); Hideki Kashiyama, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 272 days.

(21) Appl. No.: 16/777,331

(22) Filed: Jan. 30, 2020

(65) Prior Publication Data

US 2021/0096632 A1 Apr. 1, 2021

(30) Foreign Application Priority Data

Sep. 30, 2019 (JP) .............................. JP2019-178351

(51) Int. Cl.
*G06F 1/3231* (2019.01)
*G06F 1/3287* (2019.01)
*G06V 40/10* (2022.01)
*G06V 40/16* (2022.01)

(52) U.S. Cl.
CPC .......... *G06F 1/3231* (2013.01); *G06F 1/3287* (2013.01); *G06V 40/103* (2022.01); *G06V 40/164* (2022.01)

(58) Field of Classification Search
CPC . G06F 1/3231; G06F 1/3287; G06K 9/00241; G06K 9/00369
See application file for complete search history.

(56) References Cited

U.S. PATENT DOCUMENTS

| 2014/0267034 A1* | 9/2014 | Krulce | G06F 1/3265 345/158 |
| 2014/0376773 A1* | 12/2014 | Holz | G06F 3/0304 382/103 |
| 2019/0129492 A1* | 5/2019 | Chen | G06F 1/266 |

FOREIGN PATENT DOCUMENTS

| JP | 2003255922 A | 9/2003 |
| JP | 2013115649 A | 6/2013 |
| JP | 2016062148 A | 4/2016 |
| JP | 2016178348 A | 10/2016 |

* cited by examiner

*Primary Examiner* — Kim Huynh
*Assistant Examiner* — Eric Chang
(74) *Attorney, Agent, or Firm* — Shimokaji IP

(57) ABSTRACT

An information processing apparatus includes: an imaging unit having an image sensor to detect a plurality of pieces of pixel information, the imaging unit being configured to generate an image made up of the plurality of pieces of pixel information detected by the image sensor; an image processor to detect whether a user is present or not in a predetermined detection range, based on an image made up of a plurality of pieces of pixel information detected by the image sensor; and an operation control unit to, when the image processor detects the user in the predetermined range, cancel a standby state where a part of the system functions stops. In the standby state, the imaging unit increases at least one of resolution and a frame rate in a stepwise manner to detect the plurality of pieces of pixel information.

8 Claims, 7 Drawing Sheets

| DETECTION STAGE DURING STANDBY | RESOLUTION | FRAME RATE | ZOOM | CONSUMED POWER | DETECTED CONTENT |
|---|---|---|---|---|---|
| 1st STAGE | LOW RESOLUTION | ULTRALOW SPEED | WIDE RANGE | PW1 | OBJECT DETECTION |
| 2nd STAGE | MIDDLE RESOLUTION | LOW SPEED | MIDDLE RANGE | PW2 | FACE DETECTION |
| 3rd STAGE | HIGH RESOLUTION | MIDDLE SPEED | AROUND FACE | PW3 | USER DISTANCE, FACE DIRECTION |

FIG. 4

| DETECTION STAGE DURING OPERATION | RESOLUTION | FRAME RATE | CONSUMED POWER | DETECTED CONTENT |
|---|---|---|---|---|
| 1st STAGE | MIDDLE-LOW RESOLUTION | LOW SPEED | PW4 | FACE POSITION |
| 2nd STAGE | MIDDLE RESOLUTION | MIDDLE-LOW SPEED | PW5 | FACE DIRECTION |
| 3rd STAGE | HIGH RESOLUTION | MIDDLE SPEED | PW6 | LINE OF SIGHT, FACE DIRECTION |

FIG. 5

INFORMATION PROCESSING APPARATUS AND CONTROL METHOD

FIELD OF THE INVENTION

The present invention relates to an information processing apparatus and a control method.

BACKGROUND OF THE INVENTION

Recently known information processing apparatuses, such as PCs (personal computers), transition to an operable state when a user approaches the information processing apparatus and transition to a standby state so that the information processing apparatus stops the functions other than some functions when the user is away from the information processing apparatus (for example, Japanese Unexamined Patent Application Publication No. 2003-255922). Such an information processing apparatus detects the user approach with a proximity sensor, such as an infrared ray sensor.

SUMMARY OF THE INVENTION

Some of the information processing apparatuses are equipped with an imaging unit, such as a camera. These information processing apparatuses can detect user approach with an image taken by the imaging unit, instead of with the proximity sensor. Such information processing apparatuses have a problem of large standby power that is consumed power during the standby state, because the imaging unit consumes power more than the proximity sensor does.

In order to solve the above problem, the present invention aims to provide an information processing apparatus and a control method enabling correct detection of the user approach while reducing the standby power.

To solve the above problem, an information processing apparatus according to one aspect of the present invention includes: an imaging unit having an image sensor configured to detect a plurality of pieces of pixel information, the imaging unit being configured to generate an image that is made up of the plurality of pieces of pixel information detected by the image sensor; an image processor configured to detect whether a user is present or not in a predetermined detection range, based on an image that is made up of a plurality of pieces of pixel information detected by the image sensor; and an operation control unit configured to, when the image processor detects the user in the predetermined range, cancel a standby state where a part of functions (some functions) of a system of the information processing apparatus stops. In the standby state, the imaging unit increases at least one of resolution and a frame rate in a stepwise manner to detect the plurality of pieces of pixel information.

In the information processing apparatus according to one aspect of the present invention, the image processor in the standby state may detect an object in the predetermined detection range based on the image having the resolution and the frame rate of a first condition. When the object is detected in the predetermined range, the image processor may detect whether the user is present or not in the predetermined detection range based on the image of a second condition, the image of the second condition having at least one of the resolution and the frame rate that is higher than the resolution and the frame rate of the first condition.

In the information processing apparatus according to one aspect of the present invention, the image processor may detect the object at a first stage based on a first image having first resolution obtained by removing some pieces of pixel information from an overall range of the image sensor and detected at a first frame rate, when the object is detected at the first stage, the image processor at a second stage may detect whether the object detected at the first stage includes a human face or not based on a second image having second resolution higher than the first resolution and detected at a second frame rate higher than the first frame rate, and when the human face is detected at the second stage, the image processor at a third stage may detect a distance from the imaging unit to the human face detected at the second stage based on a third image having third resolution higher than the second resolution and detected at a third frame rate higher than the second frame rate so as to detect whether the user is present in the predetermined detection range or not.

In the information processing apparatus according to one aspect of the present invention, the imaging unit may include the image processor, and when presence of the user is detected in the standby state, the image processor may function as a complex device having multi-functions, and output a cancel request to request cancel of the standby state through an interface of a device class that is different from a device class to output an image made up of the plurality of pieces of pixel information.

In the information processing apparatus according to one aspect of the present invention, the image processor may output the cancel request through a HID (Human Interface Device) device class of a USB (Universal Serial Bus) interface.

In the information processing apparatus according to one aspect of the present invention, when a detection target is detected in the predetermined range, the image processor may narrow a range into a partial range including the detection target and increase resolution of the narrowed range.

In the information processing apparatus according to one aspect of the present invention, the image processor may regularly detect whether the user is present or not in the predetermined detection range in a normal operating state after cancelling the standby state, and in the normal operating state, when the image processor does not detect presence of the user in the predetermined detection range, the operation control unit may control to transition the system from the normal operating state to the standby state.

In the information processing apparatus according to one aspect of the present invention, in the normal operating state as well, the imaging unit may increase at least one of the resolution and the frame rate in a stepwise manner to detect the plurality of pieces of pixel information.

In the information processing apparatus according to one aspect of the present invention, the image processor in the normal operating state may detect whether the user is present or not in the predetermined detection range, based on an image having at least one of the resolution and frame rate that increases in a stepwise manner, the detection being based on any one of or combination of a face position, a face direction, and a line of sight of the user.

An information processing apparatus according to one aspect of the present invention includes: an imaging unit having an image sensor configured to detect a plurality of pieces of pixel information, the imaging unit being configured to generate an image that is made up of the plurality of pieces of pixel information detected by the image sensor; an image processor configured to detect whether a user is present or not in a predetermined detection range, based on an image that is made up of a plurality of pieces of pixel information detected by the image sensor; and an operation control unit configured to, when the image processor detects the user in the predetermined range, cancel a standby state where a part of functions of a system of the information processing apparatus stops. The imaging unit includes the image processor. When presence of the user is detected in the standby state, the image processor functions as a complex device having multi-functions, and outputs a cancel request to request cancel of the standby state through an interface of a device class that is different from a device class to output an image made up of the plurality of pieces of pixel information.

A control method according to one aspect of the present invention controls an information processing apparatus including an imaging unit having an image sensor configured to detect a plurality of pieces of pixel information, the imaging unit being configured to generate an image that is made up of the plurality of pieces of pixel information detected by the image sensor. The method includes: a detection step where the imaging unit is in a standby state where a part of functions of a system of the information processing apparatus stops, and the imaging unit increases at least one of resolution and a frame rate in a stepwise manner to detect the plurality of pieces of pixel information; an image processing step where an image processor detects whether a user is present or not in a predetermined detection range based on an image made up of the plurality of pieces of pixel information detected at the detection step; and an operation control step where when the image processing step detects the user in the predetermined range, an operation control unit cancels the standby state.

A control method according to one aspect of the present invention controls an information processing apparatus including an imaging unit having an image sensor configured to detect a plurality of pieces of pixel information, the imaging unit being configured to generate an image that is made up of the plurality of pieces of pixel information detected by the image sensor. The method includes: an image processing step where an image processor detects whether a user is present or not in a predetermined detection range, based on an image that is made up of a plurality of pieces of pixel information detected by the image sensor; and an operation control step where when the image processing step detects the user in the predetermined range, an operation control unit cancels a standby state where a part of functions of a system of the information processing apparatus stops. The imaging unit includes the image processor. At the image processing step, when the image processor detects presence of the user in the standby state, the image processor functions as a complex device having multi-functions, and outputs a cancel request to request cancel of the standby state through an interface of a device class that is different from a device class to output an image made up of the plurality of pieces of pixel information.

The above described aspects of present invention can detect the user approach correctly while reducing the standby power.

BRIEF DESCRIPTION OF THE DRAWINGS

FIG. 4 shows one example of the detection stages of the imaging unit in the standby state.

FIG. 5 shows one example of the detection stages of the imaging unit in the normal operating state.

DETAILED DESCRIPTION OF THE INVENTION

Figure 1:
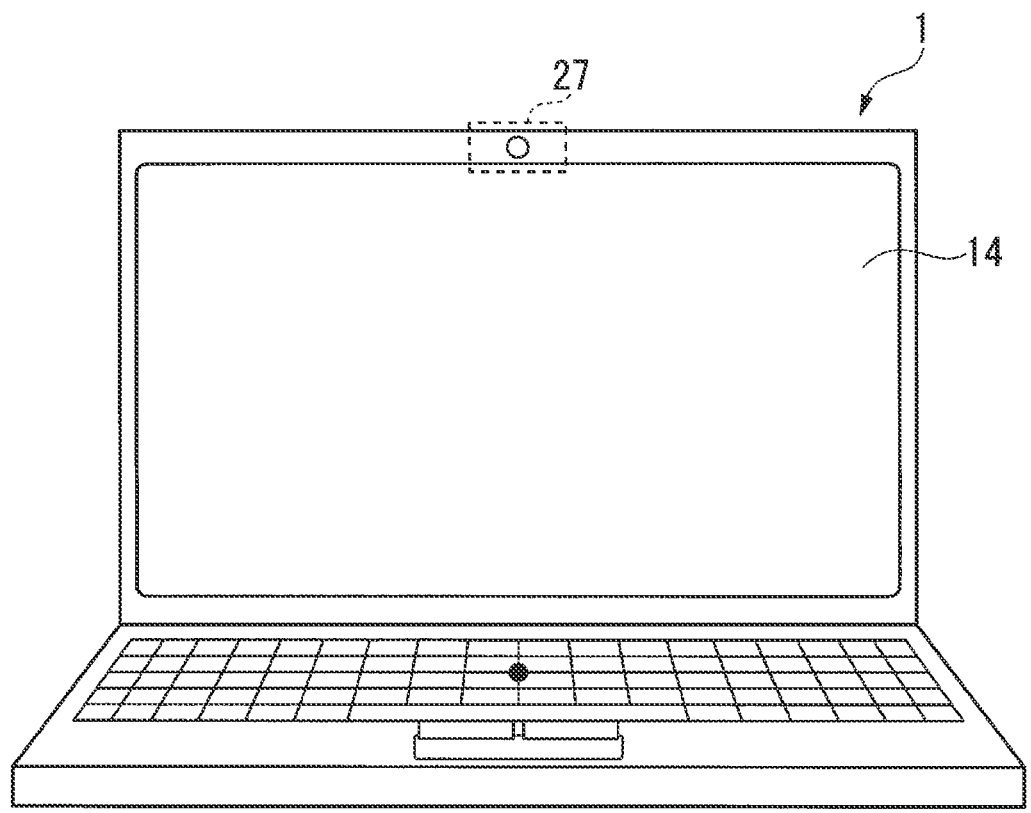
FIG. 1 shows the appearance of one example of a laptop PC according to the present embodiment.

Referring to the drawings, the following describes an information processing apparatus and a control method according to one embodiment of the present invention.

FIG. 1 shows the appearance of one example of a laptop PC 1 according to the present embodiment. The following describes the present embodiment by way of the laptop PC 1 as one example of the information processing apparatus.

As shown in FIG. 1, the laptop PC 1 includes an imaging unit 27 above a display unit 14. In a standby state where the laptop PC 1 stops a part of the functions of the system, the imaging unit 27 detects user approach to cancel the standby state. In a normal operating state, when the imaging unit 27 detects a not-operating state of the laptop PC 1 because the user left the desk, for example, the laptop PC 1 transitions to a standby state where the display on the display unit 14 stops, for example.

Figure 2:
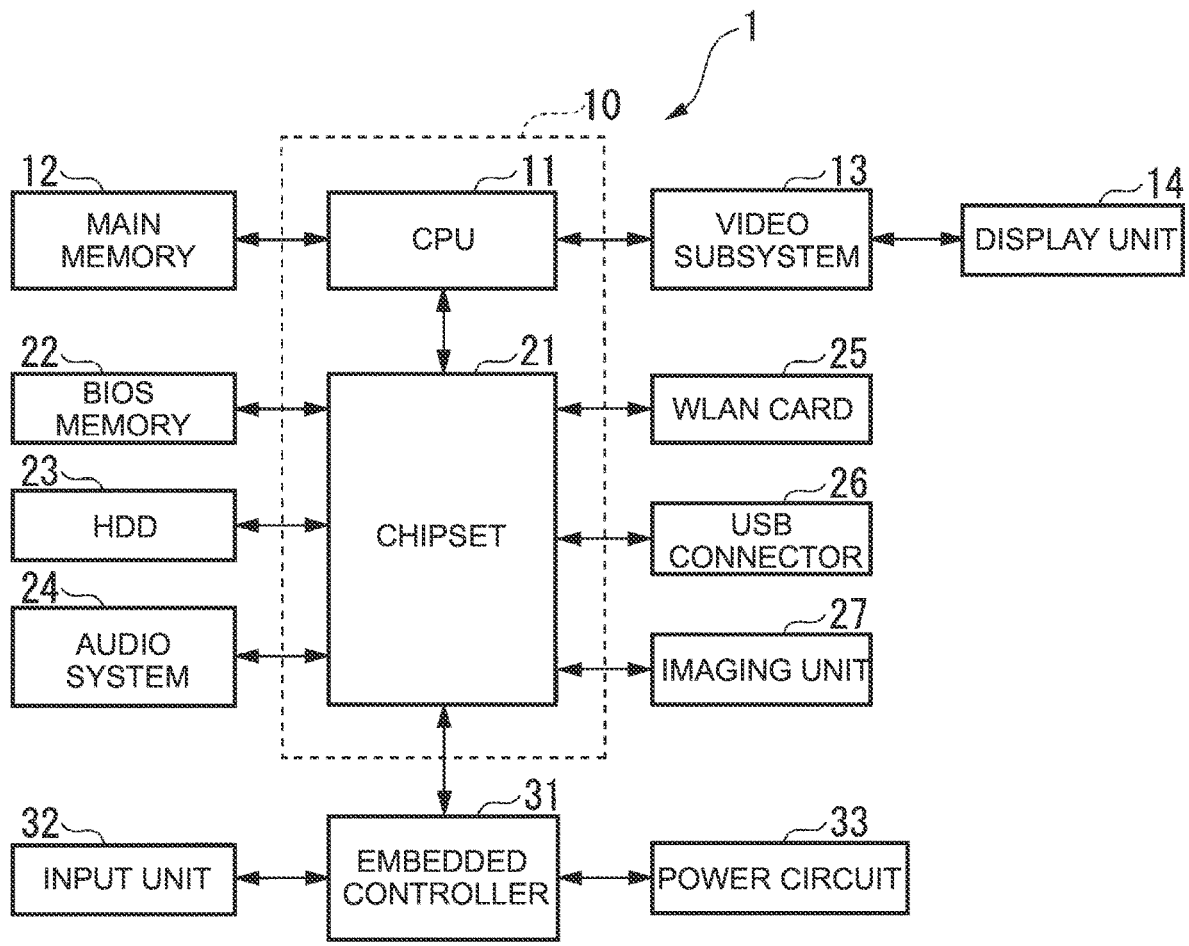
FIG. 2 shows one example of a major hardware configuration of the laptop PC according to the present embodiment.

FIG. 2 shows one example of a major hardware configuration of the laptop PC according to the present embodiment.

As shown in FIG. 2, the laptop PC 1 includes a CPU 11, a main memory 12, a video subsystem 13, a display unit 14, a chipset 21, a BIOS memory 22, a HDD 23, an audio system 24, a WLAN card 25, a USB connector 26, the imaging unit 27, an embedded controller 31, an input unit 32, and a power circuit 33.

In the present embodiment, the CPU 11 and the chipset 21 correspond to a main controller 10.

The CPU (Central Processing Unit) 11 executes various types of arithmetic processing under the control of programs to control the laptop PC 1 as a whole.

The main memory 12 is a writable memory functioning as a read-in area of a program executed by the CPU 11 or a work area to write data processed by the executed program. The main memory 12 includes a plurality of DRAM (Dynamic Random Access Memory) chips, for example. The program executed includes an OS, various types of drivers to operate peripherals as hardware, various types of service/utility and application programs.

The video subsystem 13 implements the functions relating to image displaying, and includes a video controller. This video controller processes a drawing instruction from the CPU 11 and writes the processed drawing information on a video memory. The video controller also reads this drawing information from the video memory and outputs the drawing information as drawing data (display data) to the display unit 14.

The display unit 14 is a liquid crystal display, for example, and displays a screen based on the drawing data (display data) output from the video subsystem 13.

The chipset 21 includes controllers, such as USB (Universal Serial Bus), serial ATA (AT Attachment), SPI (Serial Peripheral Interface) bus, PCI (Peripheral Component Interconnect) bus, PCI-Express bus, or LPC (Low Pin Count) bus, and connects to a plurality of devices. FIG. 2 shows examples of the devices connected to the chipset 21, including the BIOS memory 22, the HDD 23, the audio system 24, the WLAN card 25, the USB connector 26, and the imaging unit 27.

The BIOS (Basic Input Output System) memory 22 includes a non-volatile memory that is electrically rewritable, such as an EEPROM (Electrically Erasable Programmable Read Only Memory) or a flash ROM. The BIOS memory 22 stores BIOS and system firmware to control the embedded controller 31 or the like.

The HDD (Hard Disk Drive) 23 is one example of a non-volatile memory, and stores an OS, various types of drivers, various types of services/utilities and application programs, and various types of data.

The audio system 24 records, reproduces, and outputs audio data.

The WLAN (Wireless Local Area Network) card 25 connects to a network via wireless LAN for data communication. When receiving data from the network, for example, the WLAN card 25 generates an event trigger indicating the data reception.

The USB connector 26 is to connect peripherals using USB.

The imaging unit 27 is a Web camera disposed above the display unit 14 as shown in FIG. 1, for example, and takes an image. The imaging unit 27 connects to the chipset 21 via the USB interface. The configuration of the imaging unit 27 is described later in details, with reference to FIG. 3.

The embedded controller 31 is a one-chip microcomputer to monitor and control various devices (e.g., peripherals and sensors), irrespective of the system state of the laptop PC 1. The embedded controller 31 also has a power-management function to control the power circuit 33. The embedded controller 31 includes a CPU, a ROM, and a RAM not illustrated, and has an A/D input terminal, a D/A output terminal, a timer, and a digital input/output terminal for a plurality of channels. The embedded controller 31 connects with the input unit 32, the power circuit 33 and the like via these input/output terminals, and the embedded controller 31 controls the operation of these components.

The embedded controller 31 controls the power circuit 33 in accordance with the system state (e.g., S0 state to S5 state) specified by ACPI (Advanced Configuration and Power Interface). The S0 state is the most active state that is a normal running state (normal operating state). The S5 state is the shutdown state (power discontinuity state) where power turns off by software.

The CPU 11 of the present embodiment corresponds to a S0ix state that is a low power-consumption state and returns to the S0 state quickly. The embedded controller 31 controls the power circuit 33 so as to correspond to the standby mode based on this S0ix state (e.g., a modern standby mode). The S0ix state is an extended state of the S0 state specified by ACPI, and consumes power less than the S0 state does.

In the present embodiment, the standby state stops a part (some) of the functions of the system in the laptop PC 1, and the S0ix state and the S1 state to the S4 state correspond to the standby state, for example.

The input unit 32 includes various types of input devices, including a keyboard, a pointing device, and a touch pad.

The power circuit 33 includes a DC/DC converter, a discharge/charge unit, a battery unit, an AC/DC adaptor and the like, and converts DC voltage supplied from the AC/DC adaptor or the battery unit to a plurality of levels of voltage required to operate the laptop PC 1. The power circuit 33 supplies electricity to various parts of the laptop PC 1 under the control of the embedded controller 31.

Figure 3:
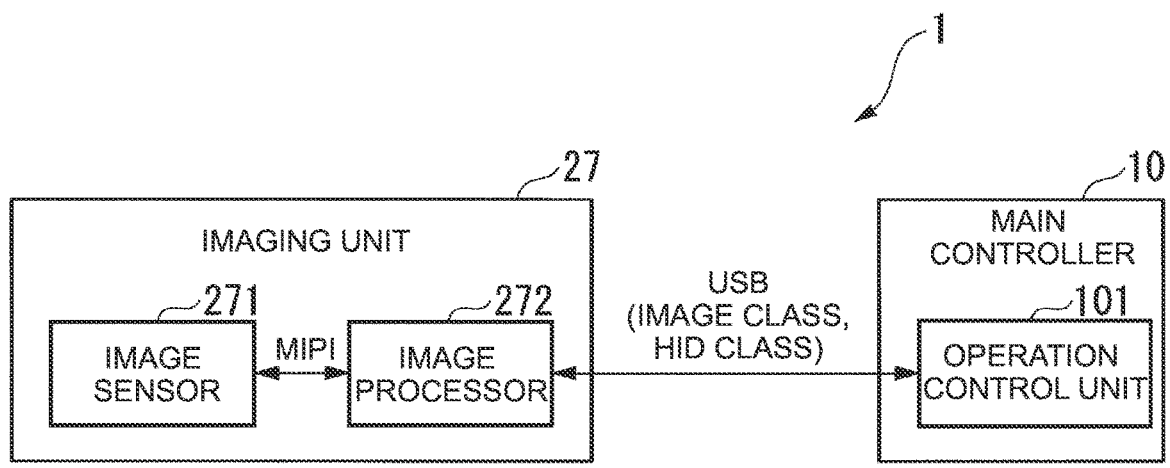
FIG. 3 is a block diagram showing one example of the functional configuration of the laptop PC according to the present embodiment.

Referring next to FIG. 3, the following describes the functional configuration of the laptop PC 1 according to the present embodiment.

FIG. 3 is a block diagram showing one example of the functional configuration of the laptop PC 1 according to the present embodiment.

As shown in FIG. 3, the laptop PC 1 includes the main controller 10 and the imaging unit 27. FIG. 3 shows only the major functional configuration that relates to the present embodiment.

The imaging unit 27 includes an image sensor 271 and an image processor 272. The imaging unit 27 generates an image that is made up of a plurality of pieces of pixel information detected by the image sensor 271.

The image sensor 271 (one example of the image sensor) may be a CMOS (Complementary Metal Oxide Semiconductor) image sensor, for example, and detects a plurality of pieces of pixel information (e.g., pixel values). The image sensor 271 and the image processor 272 connect via a MIPI (Mobile Industry Processor Interface), for example. In the standby state, the imaging unit 27 increases at least one of the resolution and the frame rate in a stepwise manner to detect a plurality of pieces of pixel information.

The image processor 272 is an ISP (Image Signal Processor), for example, and generates image data based on the plurality of pieces of pixel information detected by the image sensor 271. The image processor 272 connects to the main controller 10 (chipset 21) via the USB interface. The image processor 272 functions as a complex device having a plurality of functions of the USB. For the normal operating state, the image processor 272 performs processing using an image. To this end, the image processor 272 outputs a generated image to the main controller 10 (chipset 21) via an image class of the USB that is one of the device classes. When the imaging unit 27 detects a user instead of a human-detecting sensor, the image processor 272 outputs a detection result to the main controller 10 (chipset 21) via a HID (Human Interface Device) class of the USB that is one of the device classes.

The image processor 272 detects whether a user is present or not in a predetermined detection range, based on an image that is made up of a plurality of pieces of pixel information detected by the image sensor 271. In one example, the image processor 272 in the standby state removes some pieces of pixel information from the plurality of pieces of pixel information to obtain a simplified image having low resolution, and then increases the resolution of the image in a stepwise manner to detect whether a user is present or not in the predetermined detection range. That is, the image processor 272 increases at least one of the resolution and the frame rate in a stepwise manner to detect whether a user is present or not in the predetermined detection range.

The image processor 272 in the standby state detects an object in the predetermined detection range based on a simplified image having low resolution obtained by removing some pieces of pixel information from the plurality of pieces of pixel information. When an object is detected in the predetermined range, the image processor 272 detects whether a user is present or not in the predetermined detection range based on an image having higher resolution. In one example, when the image processor 272 in the standby state detects an object in the predetermined detection range based on a plurality of images having the resolution and the frame rate of a first condition, then the image processor 272 detects whether the user is present or not in the predetermined detection range based on a plurality of images of a second condition. Images of the second condition have at least one of the resolution and the frame rate that is higher than that of the first condition.

In one example, the image processor 272 in the standby state detects the user approach around the laptop PC 1 based on images that are spatially and temporally simplified in three stages.

Based on a first image having low resolution (first resolution) obtained by removing some pieces of pixel information from the overall range of the image sensor 271 and being detected at an ultralow speed (first frame rate), the image processor 272 detects an object at a first stage using an already-existing image-processing technology, for example. When the image processor 272 detects an object at the first stage, the procedure shifts to the next second stage.

When an object is detected at the first stage, then the image processor 272 at the second stage detects whether the object detected at the first stage includes a human face or not. This detection is made based on a second image having middle resolution (second resolution) that is higher than the low resolution (first resolution) and being detected at a low speed (second frame rate) that is faster (higher) than the ultralow speed (first frame rate) using an already-existing image-processing technology, for example. When the image processor 272 detects a human face (the object including a human face) at the second stage, the procedure shifts to the next third stage.

When a human face is detected at the second stage, then the image processor 272 at the third stage detects whether a user is present in the predetermined detection range or not. This detection is made based on a third image having high resolution (third resolution) that is higher than the middle resolution (second resolution) and being detected at a middle speed (third frame rate) that is faster (higher) than the low speed (second frame rate) using an already-existing image-processing technology, for example, to detect a distance from the imaging unit 27 to the human face detected at the second stage.

When the presence of the user is detected in the predetermined detection range at the third stage, then the image processor 272 outputs a notification of user detection indicating that the user is present in the predetermined detection range to the main controller 10 via the HID class. That is, when the presence of the user is detected in the standby state, the image processor 272 outputs a cancel request to request cancel of the standby state through the interface of a device class that is different from the device class (image class) to output an image in the normal operating state. The HID class includes an HID keyboard class, an HID mouse class, and the like.

To increase the resolution of a simplified image having low resolution, the image processor 272 may zoom up a predetermined range. When a detection target (e.g., an object, or a human face) is detected in the predetermined range, the image processor 272 may narrow a range into a partial range including the detection target and then increase the resolution of the narrowed range.

Referring next to FIG. 4, the following describes a specific example of the first stage to the third stage in the standby state as stated above.

FIG. 4 shows one example of the detection stages of the imaging unit 27 in the standby state.

FIG. 4 shows the "resolution", the "frame rate", the "zoom", the "consumed power", and the "detected content" at each detection stage of the first stage through the third stage in the standby state. The "resolution" is a physical resolution of pixels detected by the image sensor 271. The "frame rate" is a detection rate (detection interval) of the image sensor 271. The "zoom" indicates the range or the region to increase the resolution to high. The "consumed power" indicates the consumed power of the imaging unit 27 during the detection at each stage. Lower "resolution" or a lower "frame rate" reduces the processing amount of an image, and accordingly reduces the "consumed power".

In the example of FIG. 4, the first stage in the standby state has low resolution for the "resolution", ultralow speed for the "frame rate", wide range for the "zoom", and the smallest PW1 for the "consumed power". The second stage in the standby state has middle resolution for the "resolution", low speed for the "frame rate", middle range for the "zoom", and PW2 for the "consumed power". The third stage in the standby state has high resolution for the "resolution", middle speed for the "frame rate", around face for the "zoom", and the largest PW3 for the "consumed power". For the consumed power, PW1<PW2<PW3.

Referring back to FIG. 3, the image processor 272 in the normal operating state regularly detects whether a user is present or not in the predetermined detection range. In the normal operating state as well, the image processor 272 increases at least one of the resolution and the frame rate in a stepwise manner to detect whether a user is present or not in the predetermined detection range. In one example, the image processor 272 in the normal operating state increases at least one of the resolution and the frame rate in a stepwise manner to detect whether a user is present or not in the predetermined detection range, whereby the image processor 272 detects whether the user is using the laptop PC 1 or not.

In one example, the image processor 272 in the normal operating state detects that the user is using the laptop PC 1 based on images that are spatially and temporally simplified in three stages.

Based on a fourth image having middle-low resolution (fourth resolution) obtained by removing some pieces of pixel information from the overall range of the image sensor 271 and being detected at a low speed (fourth frame rate), the image processor 272 detects the position of a human face at the first stage using an already-existing image-processing technology, for example. When the image processor 272 detects the position of a human face at the first stage, the procedure shifts to the next second stage.

When the position of a human face is detected at the first stage, then the image processor 272 at the second stage detects the direction of the face. This detection is made based on a fifth image having middle resolution (fifth resolution) that is higher than the middle-low resolution (fourth resolution) and being detected at a middle-low speed (fifth frame rate) that is faster (higher) than the low speed (fourth frame rate) using an already-existing image-processing technology, for example. When the image processor 272 detects the direction of the face at the second stage, the procedure shifts to the next third stage.

When the direction of the face is detected at the second stage, then the image processor 272 at the third stage detects the line of sight of the face and the direction of the face to detect whether the user is using the laptop PC 1 or not. This detection is made based on a sixth image having high resolution (sixth resolution) that is higher than the middle resolution (fifth resolution) and being detected at a middle speed (sixth frame rate) that is faster (higher) than the middle-low speed (fifth frame rate) using an already-existing image-processing technology, for example.

In this way, the image processor 272 in the normal operating state obtains an image having resolution and a frame rate that increase in a stepwise manner to detect whether a user is present or not in the predetermined detection range, based on any one of the position of the user's face, the direction of the face, and the line of sight, or the combination of them.

The middle resolution (fifth resolution) and high resolution (sixth resolution) in the normal operating state may be equal to or be different from the middle resolution (second resolution) and high resolution (third resolution) in the standby state as stated above. The low speed (fourth frame rate) and middle speed (sixth frame rate) in the normal operating state may be equal to or be different from the low speed (first frame rate) and middle speed (second frame rate) in the standby state as stated above.

The image processor 272 at the third stage outputs a user detection result indicating whether a user is using the laptop PC 1 or not to the main controller 10 via the HID class.

Referring next to FIG. 5, the following describes a specific example of the first stage to the third stage in the normal operating state as stated above.

FIG. 5 shows one example of the detection stages of the imaging unit 27 in the normal operating state.

FIG. 5 shows the "resolution", the "frame rate", the "consumed power", and the "detected content" at each detection stage of the first stage through the third stage in the normal operating state. These items are similar to those described above referring to FIG. 4.

In the example of FIG. 5, the first stage in the normal operating state has middle-low resolution for the "resolution", low speed for the "frame rate", and PW4 for the "consumed power". The second stage in the normal operating state has middle resolution for the "resolution", middle-low speed for the "frame rate", and PW5 for the "consumed power". The third stage in the normal operating state has high resolution for the "resolution", middle speed for the "frame rate", and PW6 for the "consumed power". For the consumed power, PW4<PW5<PW6.

Referring back again to FIG. 3, the main controller 10 executes system processing in accordance with the system (e.g., the system implemented using an OS (Operating System), such as Windows (registered trademark)). The main controller 10 includes the operation control unit 101.

When the image processor 272 detects a user in the predetermined range, the operation control unit 101 cancels the standby state. In one example, when the operation control unit 101 in the standby state receives a user detection notification (cancel request to request the cancel of the standby state) from the imaging unit 27 via the HID class, then the operation control unit 101 controls the embedded controller 31 to cancel the standby state as stated above, such as the S0ix state and the S1 to S3 state, and transition the system to the normal operating state (S0 state).

In the normal operating state, when the image processor 272 does not detect the presence of a user in the predetermined detection range, then the operation control unit 101 controls to transition the system from the normal operating state to the standby state. The operation control unit 101 in the normal operating state receives a user detection result (a detection result indicating whether a user is using the laptop PC 1 or not) from the imaging unit 27 via the HID class. When a user is using the laptop PC 1, then the operation control unit 101 keeps the normal operating state. When a user is not using the laptop PC 1 (when the presence of the user is not detected in the predetermined detection range), then the operation control unit 101 controls the embedded controller 31 to transition the system to the standby state, such as the S0ix state and the S1 to S4 state as stated above.

Referring next to the drawing, the following describes the operation of the laptop PC 1 according to the present embodiment.

Figure 6:
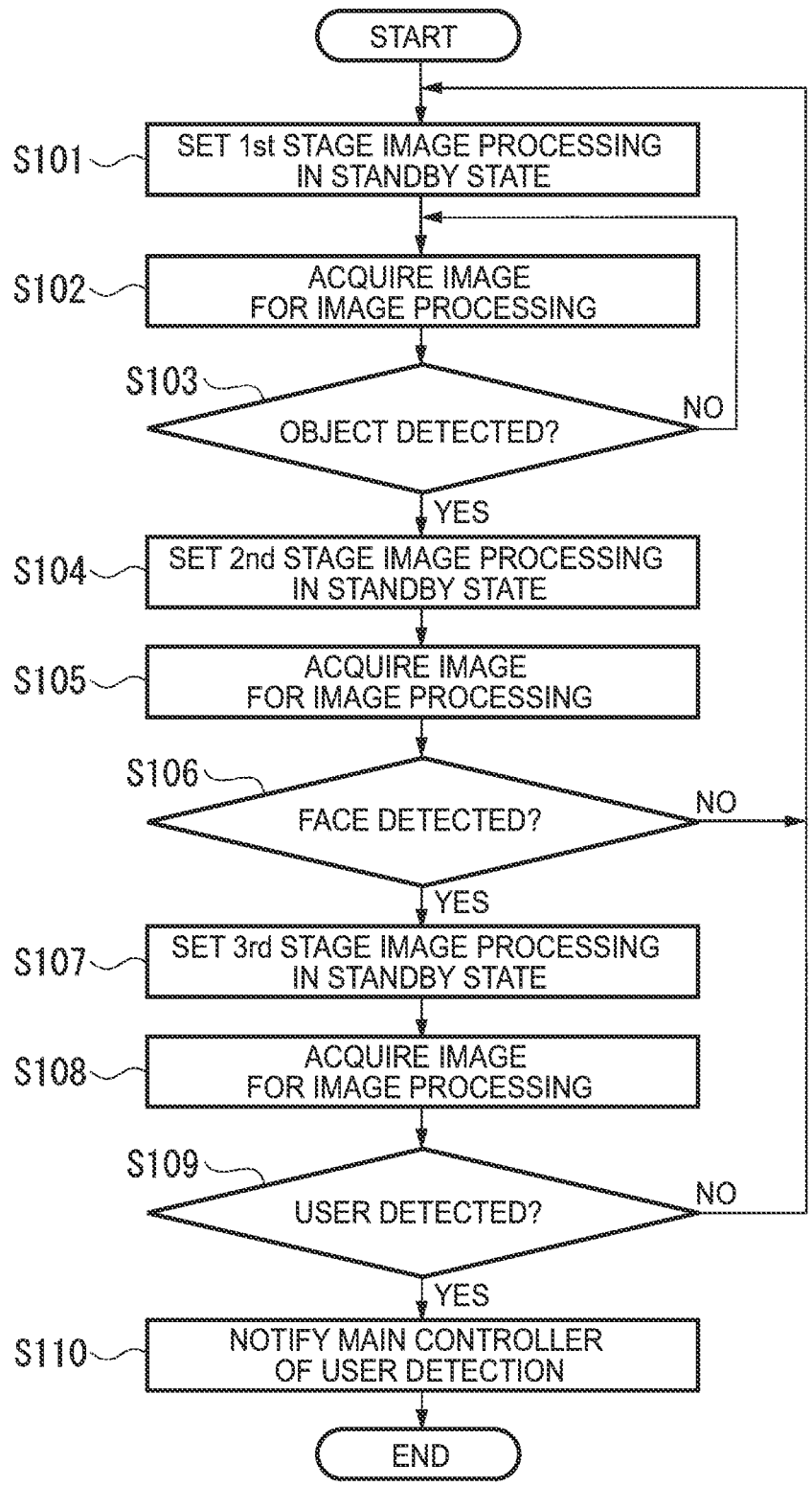
FIG. 6 is a flowchart showing one example of the operation of the laptop PC in the standby state according to the present embodiment.

FIG. 6 is a flowchart showing one example of the operation of the laptop PC 1 in the standby state according to the present embodiment. The following describes the operation of the imaging unit 27 in the laptop PC 1.

As shown FIG. 6, the image processor 272 of the imaging unit 27 in the standby state firstly sets the first stage in the standby state (step S101). In one example, the image processor 272 sets the first stage of FIG. 4 to start the detection of pixel information of the image sensor 271.

Next the image processor 272 acquires an image and conducts image processing for detection (step S102). Specifically the image processor 272 acquires pixel information of the image sensor 271 and generates a simplified image with the resolution at the first stage. The image processor 272 then detects whether an object is present in a predetermined detection range or not based on a plurality of images generated at a frame rate (detection interval) at the first stage.

Next the image processor 272 determines whether an object is detected or not (step S103). When an object is detected (YES at step S103), the image processor 272 shifts the procedure to step S104. When an object is not detected (NO at step S103), the image processor 272 returns the procedure to step S102 to repeat the detection of an object at the frame rate (detection interval) set at the first stage.

At step S104, the image processor 272 sets a second stage in the standby state. In one example, the image processor 272 sets the second stage of FIG. 4 to start the detection of pixel information of the image sensor 271.

Next the image processor 272 acquires an image and conducts image processing for detection (step S105). Specifically the image processor 272 acquires pixel information of the image sensor 271 and generates a simplified image with the resolution at the second stage. The image processor 272 then detects whether the object detected at the first stage includes a human face or not based on a plurality of images generated at a frame rate (detection interval) at the second stage.

Next the image processor 272 determines whether a human face is detected or not (step S106). When a human face is detected (YES at step S106), the image processor 272 shifts the procedure to step S107. When a human face is not detected (NO at step S106), the image processor 272 returns the procedure to step S101.

At step S107, the image processor 272 sets a third stage in the standby state. In one example, the image processor 272 sets the third stage of FIG. 4 to start the detection of pixel information of the image sensor 271.

Next the image processor 272 acquires an image and conducts image processing for detection (step S108). Specifically the image processor 272 acquires pixel information of the image sensor 271 and generates an image with the resolution at the third stage. The image processor 272 then detects the distance to the human face detected at the second stage based on a plurality of images generated at a frame rate (detection interval) at the third stage so as to determine whether a user is present in the predetermined detection range or not.

Next the image processor 272 determines whether a user is present or not (step S109). When the presence of a user is detected (YES at step S109), the image processor 272 shifts the procedure to step S110. When the presence of a user is not detected (NO at step S109), the image processor 272 returns the procedure to step S101.

At step S110, the image processor 272 notifies the main controller 10 of the detection of a user. Specifically for a notification of the user detection via the HID device class of the USB interface, the image processor 272 notifies the main controller 10 of a cancel request to request the cancel of the standby state. After step S110, the image processor 272 ends the procedure.

In the example of FIG. 6 as stated above, when an object is not detected at step S106 (NO at step S106), the image processor 272 returns the procedure to step S101. In another example, the image processor 272 may return the procedure to step S104 to return the procedure by one stage.

Figure 7:
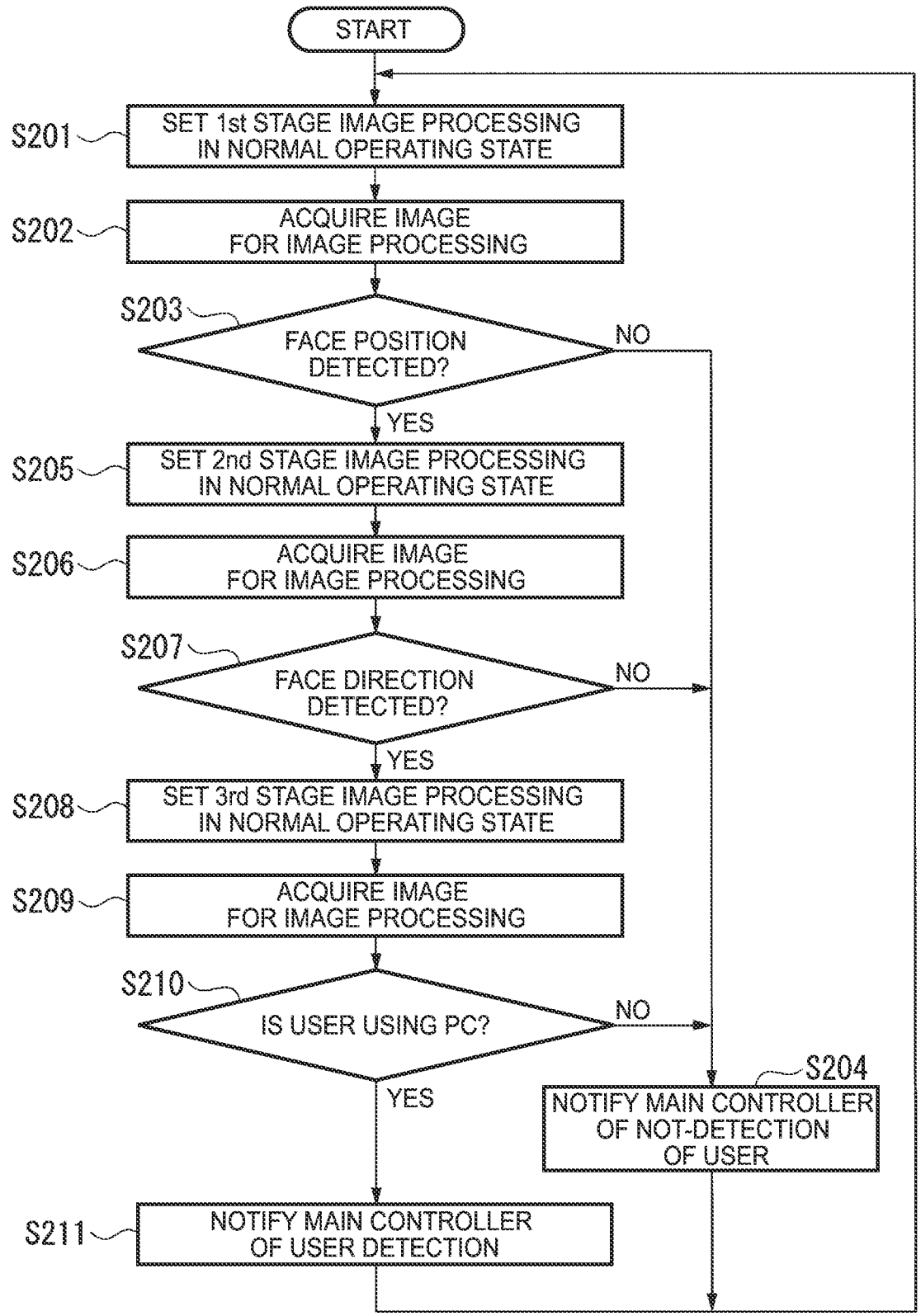
FIG. 7 is a flowchart showing one example of the operation of the laptop PC in the normal operating state according to the present embodiment.

Referring next to FIG. 7, the following describes the operation of the laptop PC 1 in the normal operating state according to the present embodiment.

FIG. 7 is a flowchart showing one example of the operation of the laptop PC 1 in the normal operating state according to the present embodiment. The following describes the operation of the imaging unit 27 in the laptop PC 1.

As shown FIG. 7, the image processor 272 of the imaging unit 27 in the normal operating state firstly sets the first stage in the normal operating state (step S201). In one example, the image processor 272 sets the first stage of FIG. 5 to start the detection of pixel information of the image sensor 271.

Next the image processor 272 acquires an image and conducts image processing for detection (step S202). Specifically the image processor 272 acquires pixel information of the image sensor 271 and generates a simplified image with the resolution at the first stage. In one example, the image processor 272 then detects the position of a user' face based on a plurality of images generated at a frame rate (detection interval) at the first stage.

Next the image processor 272 determines whether the position of a user's face is detected or not (step S203). When the position of a user's face is detected (YES at step S203), the image processor 272 shifts the procedure to step S205. When the position of a user's face is not detected (NO at step S203), the image processor 272 shifts the procedure to step S204.

At step S204, the image processor 272 notifies the main controller 10 that a user is not detected. Specifically for a detection result of a user via the HID device class of the USB interface, the image processor 272 notifies the main controller 10 of information indicating that a user is not detected. After step S204, the image processor 272 returns the procedure to step S201.

At step S205, the image processor 272 sets a second stage in the normal operating state. In one example, the image processor 272 sets the second stage of FIG. 5 to start the detection of pixel information of the image sensor 271.

Next the image processor 272 acquires an image and conducts image processing for detection (step S206). Specifically the image processor 272 acquires pixel information of the image sensor 271 and generates a simplified image with the resolution at the second stage. In one example, the image processor 272 then detects the direction of the user's face based on a plurality of images generated at a frame rate (detection interval) at the second stage.

Next the image processor 272 determines whether the direction of the user's face is detected or not (step S207).

When the direction of the user's face is detected (YES at step S207), the image processor 272 shifts the procedure to step S208. When the direction of the user's face is not detected (NO at step S207), the image processor 272 shifts the procedure to step S204.

At step S208, the image processor 272 sets a third stage in the normal operating state. In one example, the image processor 272 sets the third stage of FIG. 5 to start the detection of pixel information of the image sensor 271.

Next the image processor 272 acquires an image and conducts image processing for detection (step S209). Specifically the image processor 272 acquires pixel information of the image sensor 271 and generates an image with the resolution at the third stage. In one example, the image processor 272 then detects the line of sight of the user based on a plurality of images generated at a frame rate (detection interval) at the third stage.

Next the image processor 272 determines whether the user is using the laptop PC 1 or not based on the detected line of sight of the user (step S210). When the user is using the laptop PC 1 (YES at step S210), the image processor 272 shifts the procedure to step S211. When the user is not using the laptop PC 1 (NO at step S210), the image processor 272 shifts the procedure to step S204.

At step S211, the image processor 272 notifies the main controller 10 of the detection of a user. Specifically for a detection result of a user via the HID device class of the USB interface, the image processor 272 notifies the main controller 10 of information indicating that a user is detected. After step S211, the image processor 272 returns the procedure to step S201.

The image processor 272 repeats the procedure from step S201 to step S211 at predetermined time intervals.

Figure 8:
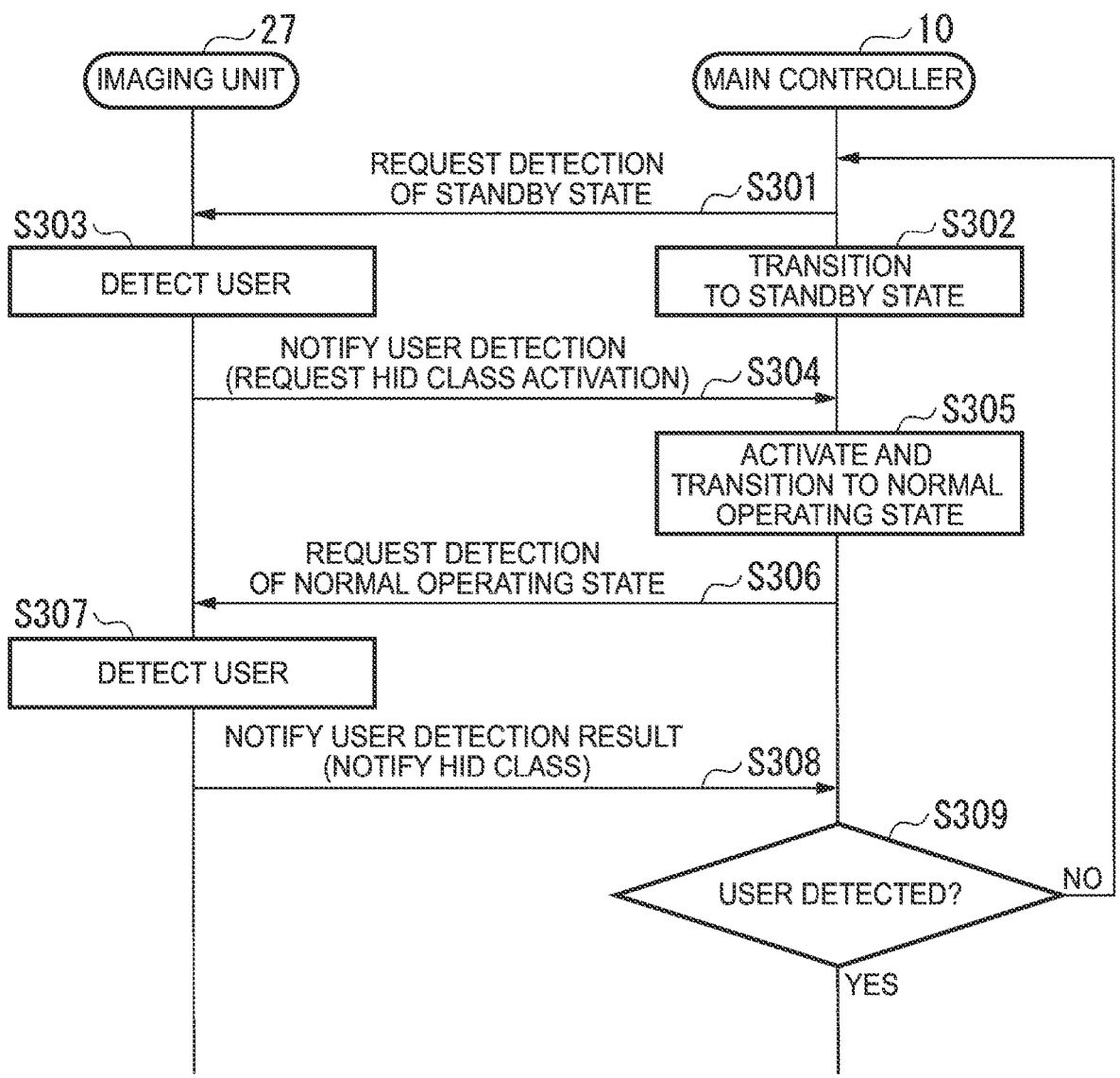
FIG. 8 shows one example of the transition operation of the laptop PC between the standby state and the normal operating state according to the present embodiment.

Referring next to FIG. 8, the following describes the transition operation of the laptop PC 1 between the standby state and the normal operating state according to the present embodiment.

FIG. 8 shows one example of the transition operation of the laptop PC 1 between the standby state and the normal operating state according to the present embodiment.

As shown FIG. 8, the main controller 10 of the laptop PC 1 firstly transmits a detection request of the standby state to the imaging unit 27 (step S301).

Next the main controller 10 transitions to the standby state (step S302). In one example, the operation control unit 101 of the main controller 10 controls to transition to the standby state, such as the modern standby mode (S0x state) or the sleep mode (S3 state).

Next the imaging unit 27 executes user detection processing in the standby state (step S303). In one example, the image processor 272 of the imaging unit 27 executes user detection processing shown in FIG. 6 in accordance with the detection request of the standby state.

Next when the imaging unit 27 detects a user, the image processor 272 of the imaging unit 27 transmits a user detection notification (activate request of the HID class) to the main controller 10 (step S304). When a user is not detected, the image processor 272 repeatedly executes the user detection processing at step S303 as stated above.

Next the main controller 10 activates the system so as to transition to the normal operating state in response to a user detection notification (activate request of the HID class) (step S305). Specifically the operation control unit 101 of the main controller 10 cancels the standby state of the laptop PC 1 for activation and controls the system to transition to the normal operating state.

Next the main controller 10 transmits a detection request of the normal operating state to the imaging unit 27 (step S306).

Next the imaging unit 27 executes user detection processing in the normal operating state (step S307). In one example, the image processor 272 of the imaging unit 27 executes user detection processing shown in FIG. 7 in accordance with the detection request of the normal operating state.

Next the image processor 272 of the imaging unit 27 transmits a user detection result (request of the HID class) to the main controller 10 at predetermined time intervals (step S308).

As shown in FIG. 7 as stated above, the image processor 272 repeatedly executes the processing at step S307 and step S308 at predetermined time intervals.

Next the main controller 10 determines whether a user is detected or not based on the received user detection result (Step S309). When a user is detected (YES at step S309), the operation control unit 101 of the main controller 10 continues the processing of the normal operating state. When a user is not detected (NO at step S309), the operation control unit 101 returns the procedure to step S302 to control the system to transition from the normal operating state to the standby state.

Figure 9:
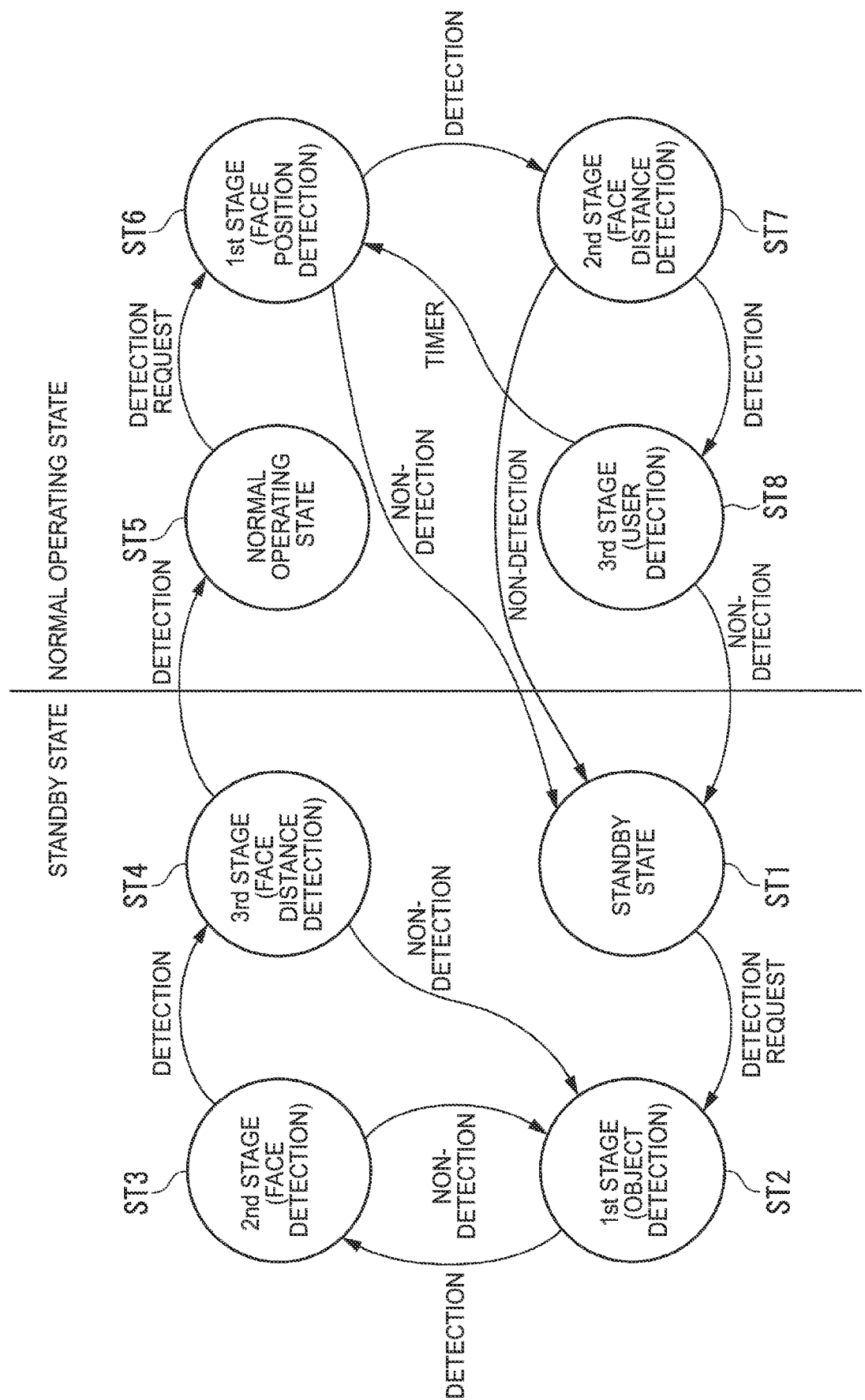
FIG. 9 shows one example of the state transition of the laptop PC according to the present embodiment.

Referring next to FIG. 9, the following describes the state transition of the laptop PC 1 according to the present embodiment.

FIG. 9 shows one example of the state transition of the laptop PC 1 according to the present embodiment.

As shown in FIG. 9, when the laptop PC 1 is in the standby state (ST1), the imaging unit 27 transitions in the order of the first stage (state ST2), the second stage (state ST3), and the third stage (state ST4) in accordance with a detection request from the main controller 10. In this way, the resolution and the frame rate increase in a stepwise manner to detect a user.

At the third stage (state ST4), when the distance to the face detected by the imaging unit 27 indicates the detection of a user, then the laptop PC 1 transitions to the normal operating state (ST5) under the control of the operation control unit 101. That is, when the imaging unit 27 in the standby state, such as a sleep mode, detects a user in the predetermined detection range, the laptop PC 1 transitions from a standby state to the normal operating state under the control of the operation control unit 101.

When the laptop PC 1 is in the normal operating state (ST5), the imaging unit 27 transitions in the order of the first stage (state ST6), the second stage (state ST7), and the third stage (state ST8) in accordance with a detection request from the main controller 10. In this way, the resolution and the frame rate increase in a stepwise manner to detect a user. The user detection processing executed by the imaging unit 27 while transitioning in the order of the first stage (state ST6), the second stage (state ST7), and the third stage (state ST8) is executed regularly at predetermined time intervals with a timer, for example.

At the third stage (state ST4), when the imaging unit 27 detects a user, then the laptop PC 1 keeps the normal operating state. When the imaging unit 27 does not detect a user, the laptop PC 1 transitions to the standby state (ST1) under the control of the operation control unit 101.

In this way when the imaging unit 27 detects that a user is using a laptop PC 1 in the normal operating state, then the laptop PC 1 keeps the normal operating state. When the imaging unit 27 detects that the user is not using the laptop PC 1 because the user left the desk or based on the direction of the user's face, then the laptop PC 1 transitions from the normal operating state to the standby state, such as a sleep mode (e.g., stopping the display on the display unit 14), under the control of the operation control unit 101.

As described above, the laptop PC 1 (information processing apparatus) according to the present embodiment includes the imaging unit 27, the image processor 272, and the operation control unit 101. The imaging unit 27 has the image sensor 271 to detect a plurality of pieces of pixel information, and generates an image that is made up of a plurality of pieces of pixel information detected by the image sensor 271. The image processor 272 detects whether a user is present or not in a predetermined detection range, based on an image that is made up of a plurality of pieces of pixel information detected by the image sensor 271. When the image processor 272 detects a user in the predetermined range, the operation control unit 101 cancels the standby state where a part of the functions of the system stops. In the standby state, the imaging unit 27 increases at least one of the resolution and the frame rate in a stepwise manner to detect a plurality of pieces of pixel information. That is, the image processor 272 in the standby state increases at least one of the resolution and the frame rate in a stepwise manner to detect whether a user is present or not in the predetermined detection range.

In this way the laptop PC 1 according to the present embodiment performs the processing in the standby state with an image made up of a plurality of pieces of pixel information that is detected by increasing at least one of the resolution and the frame rate in a stepwise manner. This reduces the amount of processing of the image, and in one example, the consumed power of the imaging unit 27 reduces as shown in FIG. 4. The laptop PC 1 of the present embodiment therefore detects the user approach correctly while reducing the standby power.

The laptop PC 1 of the present embodiment has a simple configuration because it does not require a human-detecting sensor.

The image processor 272 of the present embodiment in the standby state detects an object in the predetermined detection range based on a plurality of images having the resolution and the frame rate of a first condition. When the object is detected in the predetermined range, the image processor 272 detects the user is present or not in the predetermined detection range based on a plurality of images of a second condition. The images of the second condition have at least one of the resolution and the frame rate that is higher than that of the first condition.

The laptop PC 1 of the present embodiment therefore detects the user approach correctly while reducing the standby power, and reduces a false detection of the user approach.

The image processor 272 of the present embodiment in the standby state detects an object at the first stage based on a first image having a first resolution obtained by removing some pieces of the pixel information from the overall range of the image sensor 271 and detected at a first frame rate (see the first stage of FIG. 4, for example). When detecting an object at the first stage, the image processor 272 at the second stage detects whether the object detected at the first stage includes a human face or not based on a second image having second resolution higher than the first resolution and detected at a second frame rate higher than the first frame rate (see the second stage of FIG. 4, for example). When a human face is detected at the second stage, then the image processor 272 at the third stage detects a distance from the imaging unit 27 to the human face detected at the second stage and so detects whether a user is present in the predetermined detection range or not based on a third image having third resolution higher than the second resolution and detected at a third frame rate higher than the second frame rate (see the third stage of FIG. 4, for example).

In this way, the laptop PC 1 of the present embodiment performs more sophisticated detection in a stepwise manner and so enables correct detection of the user approach, and so reduces a false detection of the user approach.

The imaging unit 27 of the present embodiment includes the image processor 272. When the presence of a user is detected in the standby state, the image processor 272 functions as a complex device having multi-functions, and outputs a cancel request to request cancel of the standby state through the interface of a device class that is different from the device class (e.g., image class) to output an image made up of a plurality of pieces of pixel information. In one example, the image processor 272 outputs a cancel request to request the cancel of the standby state through a HID device class of the USB interface.

With this configuration, the laptop PC 1 of the present embodiment in the standby state does not externally output an image detected for the detection of user approach, and outputs only a cancel request as a detection result to the outside of the imaging unit 27. This avoids abuse of an image taken in the standby state. The laptop PC 1 of the present embodiment therefore detects the user approach correctly while ensuring the security.

The imaging unit 27 functions as a complex device having multi-functions of the USB. This is a communication of a device class that is different from the device class for the processing of the laptop PC 1 with a normal image, and so enables a communication on the user detection without affecting the processing for normal image.

When a detection target is detected in the predetermined range, the image processor 272 of the present embodiment narrows a range into a partial range including the detection target (e.g., an object, a human and a face) and then increases the resolution of the narrowed range.

The laptop PC 1 of the present embodiment therefore increases the resolution of an image while suppressing an increase in consumed power of the imaging unit 27. This enables the user detection more precisely while suppressing the increase in standby power.

The image processor 272 of the present embodiment regularly detects whether a user is present or not in the predetermined detection range in the normal operating state after the cancelling of the standby state. In the normal operating state, when the image processor 272 does not detect the presence of a user in the predetermined detection range, then the operation control unit 101 controls to transition the system from the normal operating state to the standby state (e.g., sleep mode).

This allows the laptop PC 1 of the present embodiment to correctly transition to the standby state when the user is not using the laptop PC 1.

In the normal operating state as well, the imaging unit 27 of the present embodiment increases at least one of the resolution and the imaging unit in a stepwise manner to detect a plurality of pieces of pixel information. The image processor 272 in the normal operating state increases in a stepwise manner at least one of the resolution and the frame rate of a simplified image having low resolution to detect whether a user is present or not in the predetermined resolution. In one example, the image processor 272 in the normal operating state detects whether a user is present or not in the predetermined detection range, based on an image having at least one of the resolution and frame rate that increases in a stepwise manner. The image processor 272 makes this determination based on any one of the position of the user's face, the direction of the face, and the line of sight, or the combination of them.

The laptop PC 1 of the present embodiment therefore correctly detects that the user is not using the laptop PC 1 while reducing the consumed power in the normal operating state. The laptop PC 1 of the present embodiment increases at least one of the resolution and the frame rate in a stepwise manner for precise detection of a user. In this way, the laptop PC 1 of the present embodiment reduces a false detection of a user, which causes an erroneous transition from the normal operating state to the standby state.

The laptop PC 1 (information processing apparatus) according to the present embodiment includes the imaging unit 27, the image processor 272, and the operation control unit 101. The imaging unit 27 includes the image sensor 271 to detect a plurality of pieces of pixel information, and generates an image that is made up of a plurality of pieces of pixel information detected by the image sensor 271. The image processor 272 detects whether a user is present or not in a predetermined detection range, based on an image that is made up of a plurality of pieces of pixel information detected by the image sensor 271. When the image processor 272 detects a user in the predetermined range, the operation control unit 101 cancels the standby state where a part of the functions of the system stops. The imaging unit 27 includes the image processor 272. When the presence of a user is detected in the standby state, the image processor 272 functions as a complex device having multi-functions, and outputs a cancel request to request cancel of the standby state through the interface of a device class that is different from the device class to output an image made up of a plurality of pieces of pixel information.

With this configuration, the laptop PC 1 of the present embodiment in the standby state does not externally output an image detected for the detection of user approach, and outputs only a cancel request as a detection result to the outside of the imaging unit 27. This avoids abuse of an image taken in the standby state. The laptop PC 1 of the present embodiment therefore detects the user approach correctly while ensuring the security.

A control method according to the present embodiment controls the laptop PC 1 (information processing apparatus) including the imaging unit 27 as stated above. The method includes a detection step, an image processing step, and an operation control step. In the detection step, the imaging unit 27 is in the standby state where a part of the functions of the system stops, and the imaging unit 27 increases at least one of the resolution and the frame rate in a stepwise manner to detect a plurality of pieces of pixel information. In the image processing step, the image processor 272 detects whether a user is present or not in a predetermined detection range based on an image made up of a plurality of pieces of pixel information detected at the detection step. In the operation control step, when the image processing step detects a user in the predetermined range, the operation control unit 101 cancels the standby state where a part of the functions of the system stops. In the image processing step, the image processor 272 in the standby state increases at least one of the resolution and the frame rate in a stepwise manner to detect whether a user is present or not in the predetermined detection range.

The control method of the present embodiment therefore has an effect similar to that from the laptop PC 1 as stated above, and detects the user approach correctly while reducing the standby power.

A control method according to the present embodiment controls the laptop PC 1 (information processing apparatus) including the imaging unit 27 as stated above. The method includes the image processing step, and the operation control step as stated above. When the image processor 272 in the standby state detects the presence of a user at the image processing step, the image processor 272 functions as a complex device having multi-functions, and outputs a cancel request to request cancel of the standby state through the interface of a device class that is different from the device class to output an image made up of a plurality of pieces of pixel information.

The control method of the present embodiment therefore has an effect similar to that from the laptop PC 1 as stated above, and detects the user approach correctly while ensuring the security.

The present invention is not limited to the above-described embodiment, and can be modified without deviating from the scope of the present invention.

In one example, the present embodiment describes the example where the image processor 272 in the standby state changes the resolution and the frame rate at three stages to detect a user. In another example, the image processor 272 may change the resolution and the frame rate at two stages or at four or more stages. The image processor 272 in the standby state may perform more sophisticated detection, such as identification on gender or face authentication (personal authentication) in addition to the direction or the line of sight of the user's face.

The above embodiment describes the example where the image processor 272 changes both of the resolution and the frame rate to reduce the consumed power of the imaging unit 27. In another example, the image processor 272 may change any one of the resolution and the frame rate to reduce the consumed power of the imaging unit 27.

The above embodiment describes the example where the image processor 272 in the normal operating state changes the resolution and the frame rate at three stages to detect a user. In another example, the image processor 272 in this state may change the resolution and the frame rate at two stages or at four or more stages. In another example, the image processor 272 may detect a user without changing them in a stepwise manner and with single resolution and frame rate. The image processor 272 in the normal operating state may perform more sophisticated detection, such as identification on gender or face authentication (personal authentication) in addition to the direction or the line of sight of the user's face.

The above embodiment describes the example where in the normal operating state, when the image processor 272 detects once that a user is not detected (the user is not using the laptop PC), then the operation control unit 101 controls to transition the system to the standby state, such as sleep mode. In another example, when the image processor 272 detects that a user is not detected (the user is not using the laptop PC) a predetermined number of times or continuously for predetermined duration, then the operation control unit 101 may control to transition the system to the standby state.

The above embodiment describes the example where the imaging unit 27 includes the image processor 272. In another example, the main controller 10 may include a part or all of the functions of the image processor 272.

The above embodiment describes the example where the information processing apparatus is the laptop PC 1. In another example, the information processing apparatus may be another information processing apparatus, such as a tablet terminal or a desktop PC.

The above-stated configurations of the laptop PC 1 internally include a computer system. A program to implement the functions of various configurations of the laptop PC 1 as stated above may be stored in a computer-readable recording medium, and the processing at the various configurations of the laptop PC 1 may be performed by causing the computer system to read and execute the program stored in this recording medium. "Causing the computer system to read and execute the program stored in the recording medium" includes installing of such a program in the computer system. The "computer system" includes an OS and hardware, such as peripherals.

The "computer system" may include a plurality of computer apparatuses connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the laptop PC 1. Different distribution servers may distribute these divided pieces of program. The "computer readable recording medium" also includes a medium that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions as stated above may be implemented as an integrated circuit, such as a LSI (Large Scale Integration). Each of the functions as stated above may be implemented as one processor, or a part or all of the functions may be implemented as one processor in an integrated manner. A technology for integrated circuit is not limited to a LSI, and an integrated circuit may be realized using a dedicated circuit or a general-purpose processor. If a technology for integrated circuit that replaces LSIs becomes available with the development of semiconductor technologies, an integrated circuit based on such a technology may be used.

The invention claimed is:

1. An information processing apparatus comprising:
   an imaging unit having an image sensor that detects a first plurality of pieces of pixel information, the imaging unit generates an image that is made up of the first plurality of pieces of pixel information detected by the image sensor;
   an image processor that detects whether a user is present or not in a predetermined detection range, based on an image that is made up of a second plurality of pieces of pixel information detected by the image sensor; and
   an operation control unit that, when the image processor detects the user in the predetermined detection range, cancels a standby state wherein some functions of a system of the information processing apparatus stops, wherein in the standby state, the imaging unit increases at least one of a resolution and a frame rate, in a stepwise manner, to detect the first plurality of pieces of pixel information;

in the standby state, the image processor detects an object in the predetermined detection range based on an image of a first condition having a first resolution and a first frame rate;

in the standby state, after the image processor detects the object in the predetermined detection range, the image processor detects whether the user is present or not in the predetermined detection range based on an image of a second condition having at least one of a second resolution and a second frame rate that is higher than the first resolution and the first frame rate of the first condition;

in the standby state, the image processor detects the object at a first stage based on a first image having the first resolution obtained by removing some pieces of pixel information from an overall range of the image sensor and detected at the first frame rate, in the standby state, after the object is detected at the first stage, the image processor at a second stage detects whether the object detected at the first stage includes a human face or not based on a second image having the second resolution higher than the first resolution and detected at the second frame rate higher than the first frame rate, and in the standby state, after the human face is detected at the second stage, the image processor at a third stage detects a distance from the imaging unit to the human face detected at the second stage based on a third image having a third resolution higher than the second resolution and detected at a third frame rate higher than the second frame rate to detect whether the user is present in the predetermined detection range or not.

2. The information processing apparatus according to claim 1, wherein the imaging unit includes the image processor, and when presence of the user is detected in the standby state, the image processor functions as a complex device having multi-functions, and outputs a cancel request to request cancel of the standby state through an interface of a device class that is different from a device class to output an image made up of the first plurality of pieces of pixel information.

3. The information processing apparatus according to claim 2, wherein the image processor outputs the cancel request through an HID (Human Interface Device) device class of a USB (Universal Serial Bus) interface.

4. The information processing apparatus according to claim 1, wherein, when a detection target is detected in the predetermined detection range, the image processor narrows a range into a partial range including the detection target and increases resolution of the partial range.

5. The information processing apparatus according to claim 1, wherein the image processor periodically detects whether the user is present or not in the predetermined detection range in a normal operating state after cancelling the standby state, and in the normal operating state, when the image processor does not detect presence of the user in the predetermined detection range, the operation control unit controls to transition the system from the normal operating state to the standby state.

6. The information processing apparatus according to claim 5, wherein, in the normal operating state, the imaging unit increases at least one of another resolution and another frame rate in a stepwise manner to detect the first plurality of pieces of pixel information.

7. The information processing apparatus according to claim 5, wherein the image processor in the normal operating state detects whether the user is present or not in the predetermined detection range, based on an image having at least one of another resolution and another frame rate that increases in a stepwise manner, the detection being based on at least one of a face position, a face direction, and a line of sight of the user.

8. A control method for an information processing apparatus including an imaging unit having an image sensor that detects a first plurality of pieces of pixel information, the imaging unit generates an image that is made up of the first plurality of pieces of pixel information detected by the image sensor, the method comprising:

a detection step wherein the imaging unit is in a standby state wherein some function of a system of the information processing apparatus stops, and the imaging unit increases at least one of a resolution and a frame rate in a stepwise manner to detect the first plurality of pieces of pixel information;

an image processing step wherein an image processor detects whether a user is present or not in a predetermined detection range based on an image made up of a second plurality of pieces of pixel information detected at the detection step; and an operation control step wherein, when the image processing step detects the user in the predetermined range, an operation control unit cancels the standby state;

in the standby state, the image processor detects an object in the predetermined detection range based on an image of a first condition having a first resolution and a first frame rate;

in the standby state, after the image processor detects the object in the predetermined detection range, the image processor detects whether the user is present or not in the predetermined detection range based on an image of a second condition having at least one of a second resolution and a second frame rate that is higher than the first resolution and the first frame rate of the first condition;

in the standby state, the image processor detects the object at a first stage based on a first image having the first resolution obtained by removing some pieces of pixel information from an overall range of the image sensor and detected at the first frame rate, in the standby state, after the object is detected at the first stage, the image processor at a second stage detects whether the object detected at the first stage includes a human face or not based on a second image having the second resolution higher than the first resolution and detected at the second frame rate higher than the first frame rate, and in the standby state, after the human face is detected at the second stage, the image processor at a third stage detects a distance from the imaging unit to the human face detected at the second stage based on a third image having a third resolution higher than the second resolution and detected at a third frame rate higher than the second frame rate to detect whether the user is present in the predetermined detection range or not.

\* \* \* \* \*